US012790054B2

(12) United States Patent
Eßling

(10) Patent No.: US 12,790,054 B2
(45) Date of Patent: Nov. 10, 2026

(54) SYSTEM FOR ASEPTICALLY LOADING COMPONENTS INTO A PHARMACEUTICAL ISOLATOR

(71) Applicant: Franz Ziel GmbH, Billerbeck (DE)

(72) Inventor: Ralf Eßling, Gescher (DE)

(73) Assignee: Franz Ziel GmbH (DE)

( * ) Notice: Subject to any disclaimer, the term of this patent is extended or adjusted under 35 U.S.C. 154(b) by 264 days.

(21) Appl. No.: 18/389,538

(22) Filed: Nov. 14, 2023

(65) Prior Publication Data

US 2024/0076085 A1 Mar. 7, 2024

Related U.S. Application Data

(63) Continuation of application No. PCT/EP2022/081545, filed on Nov. 10, 2022.

(30) Foreign Application Priority Data

Nov. 11, 2021 (DE) ......................... 202021106178.2

(51) Int. Cl.
*B65B 55/02* (2006.01)
*A61J 1/05* (2006.01)
*B65B 61/06* (2006.01)

(52) U.S. Cl.
CPC ............... *B65B 55/027* (2013.01); *A61J 1/05* (2013.01); *B65B 61/06* (2013.01)

(58) Field of Classification Search
CPC ......... B65B 3/04; B65B 55/027; B65B 61/06; B67D 7/3209
See application file for complete search history.

(56) References Cited

U.S. PATENT DOCUMENTS

| | | | | |
|---|---|---|---|---|
| 5,447,699 A * | 9/1995 | Papciak | B65B 55/027 | 422/294 |
| 5,685,454 A * | 11/1997 | Bonerb | B65D 88/56 | 383/906 |
| 6,254,330 B1 * | 7/2001 | Steffen | B65G 65/23 | 141/285 |
| 6,581,435 B2 * | 6/2003 | Wang | G01N 33/0006 | 73/1.02 |
| 12,420,972 B2 * | 9/2025 | Nagler | B65B 55/027 | |
| 2004/0005659 A1 | 1/2004 | Giuseppe | | |
| 2016/0129234 A1 | 5/2016 | Liebe et al. | | |
| 2023/0365282 A1 * | 11/2023 | Milla | B65B 3/045 | |

FOREIGN PATENT DOCUMENTS

| | | |
|---|---|---|
| DE | 102016009678 A1 | 2/2018 |
| EP | 1571088 A1 | 9/2005 |
| JP | 2016199282 A | 1/2016 |
| JP | 6583398 B2 | 2/2019 |
| WO | 2017129362 A2 | 8/2017 |

* cited by examiner

*Primary Examiner* — Timothy L Maust

(57) ABSTRACT

A system for aseptically transferring components from a container into a pharmaceutical isolator. The system includes a single-use flexible container that holds the components, a decontamination device that is mounted on the isolator, and a transfer table that facilitates transferring the components into the isolator. The container is placed on the transfer table and a front end attached to the decontamination device. The interior of the decontamination device and a front end of the container are decontaminated and the transfer table then mechanically brought into a position which allows the components to slide in a gravity-assisted manner into the isolator.

9 Claims, 3 Drawing Sheets

SYSTEM FOR ASEPTICALLY LOADING COMPONENTS INTO A PHARMACEUTICAL ISOLATOR

BACKGROUND INFORMATION

Field of the Invention

The invention relates to the field of pharmaceutical isolators, and more specifically, to a system for aseptically loading components into the isolator.

Discussion of the Prior Art

A pharmaceutical isolator is typically used to fill ampoules or vials with medical substances, for example, to fill eye drops into small, deformable plastic vials. An outside source typically supplies the bottles or vials as sterile components in a sealed container and the components are then transferred into the isolator under aseptic conditions. Conventional systems for aseptically introducing components into an isolator are known in the pharmaceutical industry. One such conventional system is the Rapid Transfer Port (RTP) system, in which the sealed container is a canister and the isolator and canister have mating connections. These canisters are relatively heavy and a designated manipulator, such as a freely movable robot arm, is typically used to handle them. Because of their weight, they are kept as small as is feasible, which means that the number of components that can be provided in a single container is quite limited, with the result that the isolator must be frequently reloaded.

DE 10 2016 009 678 A1 discloses a system for transferring bulk sterile material from a disposable container into the isolator. The container is a disposable container that has a flexible, tube-like bag part or pouch portion. Rapid-Transfer-Port connectors are provided on both the container and the isolator, whereby it is the practice in the industry to refer to the connector on the isolator as the alpha part and the one on the container as the beta part. Different containers may have beta parts that differ somewhat in their construction yet are similar enough that they engage with the alpha part on the Rapid-Transfer-Port system that is provided on the particular isolator. After docking the container to the isolator, the pouch portion hangs downward. Later, when the Rapid-Transfer-Port has been opened, a tubular flexible bag part of the container or a rear first section of the bag part, depending on the particular embodiment of the container, is raised to facilitate emptying the container. To this end, the rear end may be suspended from one or more hooks on a suspension device.

What is needed, therefore, is a system for aseptically transferring components into a pharmaceutical isolator that has a simple and cost-effective construction. What is further needed is such a system that provides a method for operating personnel to safely and easily carry out the transfer of a large batch of components from the container into the isolator.

BRIEF SUMMARY OF THE INVENTION

The object of the invention is to provide a system that allows sterile components that are stored in a bag to be aseptically transferred into a pharmaceutical isolator. The object is achieved by providing a transfer table that is tiltable, so as to allow the components to slide into the isolator. The transfer table has a frame that allows the top of the table to be tilted toward the isolator. The table is set up directly in front of the filling port on the isolator and the bag containing the sterile components placed on the transfer table while it is in a horizontal position. Steps are taken to secure the bag on the table and to create a gas-impermeable seal between a component section of the bag that contains the sterile components and a front portion of the bag that is empty. A decontamination connector is mounted on the isolator, in front of the filling port. The cut-open end of the bag is clamped against the decontamination connector in a manner that creates a gas-tight seal. The interior space of the decontamination connector and the front portion of the bag are then decontaminated. The gas-impermeable seal that maintains the sterile conditions within the component section of the bag is then released, the table surface is then tilted upward, thereby allowing the sterile components to slide out of the bag, through the decontamination connector, and into the isolator, whereby the sterile condition of the components is maintained.

A suitable bag is a gas-impermeable plastic bag, which maintains sterility inside the bag. The plastic bag is lightweight, and this facilitates manual handling, even when the bag is filled with a plurality of components. The fact that the bag is lightweight means that it may contain a greater number of components than the canister that is used with conventional Rapid-Transfer-Port systems and that means that the process of preparing the bag for the transfer operation has to be repeated less frequently than with the conventional sealed container.

The transfer table is set up in front of the filling port of the isolator. As briefly indicated above, the components are transferred from the bag to the isolator in a gravity-assisted manner. The transfer table has a frame that includes table legs, connector struts for connecting the table to the front face of the isolator, and a tilt means that allows a back end of the table surface to be raised above the front end, thereby creating an incline or tilt that facilitates the transfer of the components into the isolator. One way to achieve this is to provide a pivot axis and an actuator to pivot the table surface about the pivot axis. Various means are suitable for tilting the table, for example, a hand crank, an electric motor, a gas pressure spring, or the like. This tiltable transfer table eliminates the need for operating personnel to manually handle the bag in order to empty it.

The rear end of the bag may be affixed to the table to prevent it from slipping forward or forming folds that would hinder or prevent the components from sliding out of the bag. A suitable means of achieving this is to mount a retaining clamp at or near the back end of the table, such that the retaining clamp may be selectively clamped onto or raised above. Such a retaining clamp may be constructed as a spring-loaded bar, whereby the spring force is sufficient to hold the rear end of the bag in place on the table surface. The retaining clamp is lifted away from the table against the spring force to allow a rear portion of the bag to be placed under the clamp, and then released so that it clamps down against that portion of the bag. In another embodiment, such a retaining clamp may be constructed as a bar that is mounted on the transfer table with an eccentric closure that applies a clamp force against the table surface when the bar is locked in place.

It is important to maintain the sterile condition within the bag throughout the process of preparing the bag for transfer and during the transfer operation. As previously mentioned, the front end of the bag is cut open so that the bag may be placed on the decontamination connector. As soon as the cut is made, ambient air moves into the bag, thereby possibly contaminating the interior of the bag. To avoid any contamination of the components, the bag is divided into two separate sections, a component section that contains the sterile components and a front section that is to be cut open. A clamping bar is mounted on the transfer table in a manner that allows the bar to be vertically or pivotably moved onto or away from the bag. Prior to placing the bag in position on the table, it is briefly held in a vertical position, so that all of the components in the bag collect in the bottom of the bag, i.e., the component section of the bag. The clamping bar is raised, and the bag then placed in position on the table, such than when the clamping bar is lowered, it effectively divides the bag into two chambers that are separated from one another in a gas-tight manner. The components are now held in what will be referred to as the component section of the bag. The front section of the bag that is between the clamping bar and the isolator is empty, i.e., contains no components. Once the clamp is fully in place and has created a gas-tight separation of the two sections of the bag, the front section of the bag can be cut open in preparation for transferring the contents of the bag to the isolator.

A cutting device may be mounted on the transfer table to cut open the front end of the bag. Permanently installing such a cutter on the table eliminates the need for operating personnel to handle a separate cutting tool and, thus, reduces a risk to personal safety. The cutting device may be constructed as a cutter that extends across the width of the table surface, near the front end of the table, so as to be in the desired location to cut the front end of the bag.

A suitable construction of the cutting device is a pivotable cutter bar that is easily moved into a cutting position. Another suitable construction is that of a bar that extends across the width of the table and that carries a slidable blade that is slid along the bar and across the front end of the bag. These types of cutting devices reliably provide a straight cut edge across the bag, thereby avoiding a jagged cut edge that could possibly result is a leaky fit of the bag against the decontamination connector.

The open end of the bag is now pushed onto the decontamination connector and secured in a gas-tight manner to the nozzle. A ring seal may be provided on the decontamination connector to provide a seal between the decontamination connector and the bag. This ring seal may be constructed as an activatable seal that allows the ring seal to be selectively activated and de-activated. Such a seal has a hollow profile into which a pressurizing agent is introduced to expand the cross section of the hollow profile and create the desired sealing effect. De-activating the ring seal allows the bag to be easily pushed onto and removed from the decontamination connector.

A clamping ring may be placed around the bag and the decontamination connector to achieve the gas-tight seal between the bag and the decontamination connector. This clamping ring is placed over the outside of the bag and the decontamination connector, so that it encircles that portion of the decontamination connector where the bag is. The clamping ring is mounted in such a way that it is movable between the clamping position on the decontamination connector and an open position in which it is removed from the decontamination connector to allow an emptied bag to be removed from the decontamination connector and seal. Other suitable means for clamping the bag against the decontamination connector that are known per se to a person skilled in the art may also be used.

The ring seal may be provided on the outer surface of the decontamination connector or the inner surface of the clamping ring, or on both. If the ring seal is provided on the outer circumference of the decontamination connector, activating the seal forces the outer diameter of the seal to expand. Alternatively, if the seal is provided on the inner circumference of the clamping ring, activating the seal causes the inner diameter to expand. Irrespective of whether the ring seal is arranged on the decontamination connector or on the clamping ring, or whether an activatable seal is provided on both elements, activating the ring seal prevents any leaks from occurring due to a flexing or stretching of the bag, and deactivation of the seal allows the bag to be easily placed onto or removed from the decontamination connector. Once the bag is connected to the decontamination connector in a gas-tight manner, this front bag section and also the interior space within the decontamination connector is decontaminated.

The decontamination connector includes a spray nozzle for dispensing a decontamination agent. The spray nozzle opens into the interior of the decontamination connector and dispenses the decontamination agent into the interior space of the decontamination connector and the front section of the bag. After decontamination has been completed, the closure on the filling port of the isolator is removed or opened and the clamping bar released from the bag on the table, to allow the components from the component section of the bag to pass through the now sterile front section of the bag and the likewise now sterile decontamination connector into the filling port and thus into the isolator.

In order to reliably decontaminate the open end of the bag, it is important that the seal between bag and decontamination connector be gas-tight. One way of checking this is to provide a pressure sensor that is linked to an electronic control. When the bag has been pushed onto the decontamination connector and the seal activated, the pressure sensor senses the prevailing pressure inside the decontamination connector for a certain period of time, in order to detect a drop in pressure if such should occur. At this stage of the process of transferring the components into the isolator, the filling port of the isolator is still closed and the clamping bar is still in place on the bag, separating the front end of the bag from the sterile component section of the bag. When the decontamination agent is introduced into the decontamination connector and the front end of the bag, an electronic control automatically activates the pressure sensor. The fact that no drop in pressure is detected within the predetermined period of time during the decontamination step is an indication that the decontaminated atmosphere in the decontamination connector and the front end of the bag is sterile. The filling port can now be opened and the clamping bar be removed from the bag, to allow the components to slide from the bag into the isolator.

BRIEF DESCRIPTION OF THE DRAWINGS

The present invention is described with reference to the accompanying drawing that illustrates a preferred embodiment of the invention. This invention should, however, not be construed as limited to the embodiment set forth herein; rather, the drawing is provided so that this disclosure will be complete and will fully convey the scope of the invention to those skilled in the art.

DETAILED DESCRIPTION OF THE INVENTION

Figure 1:
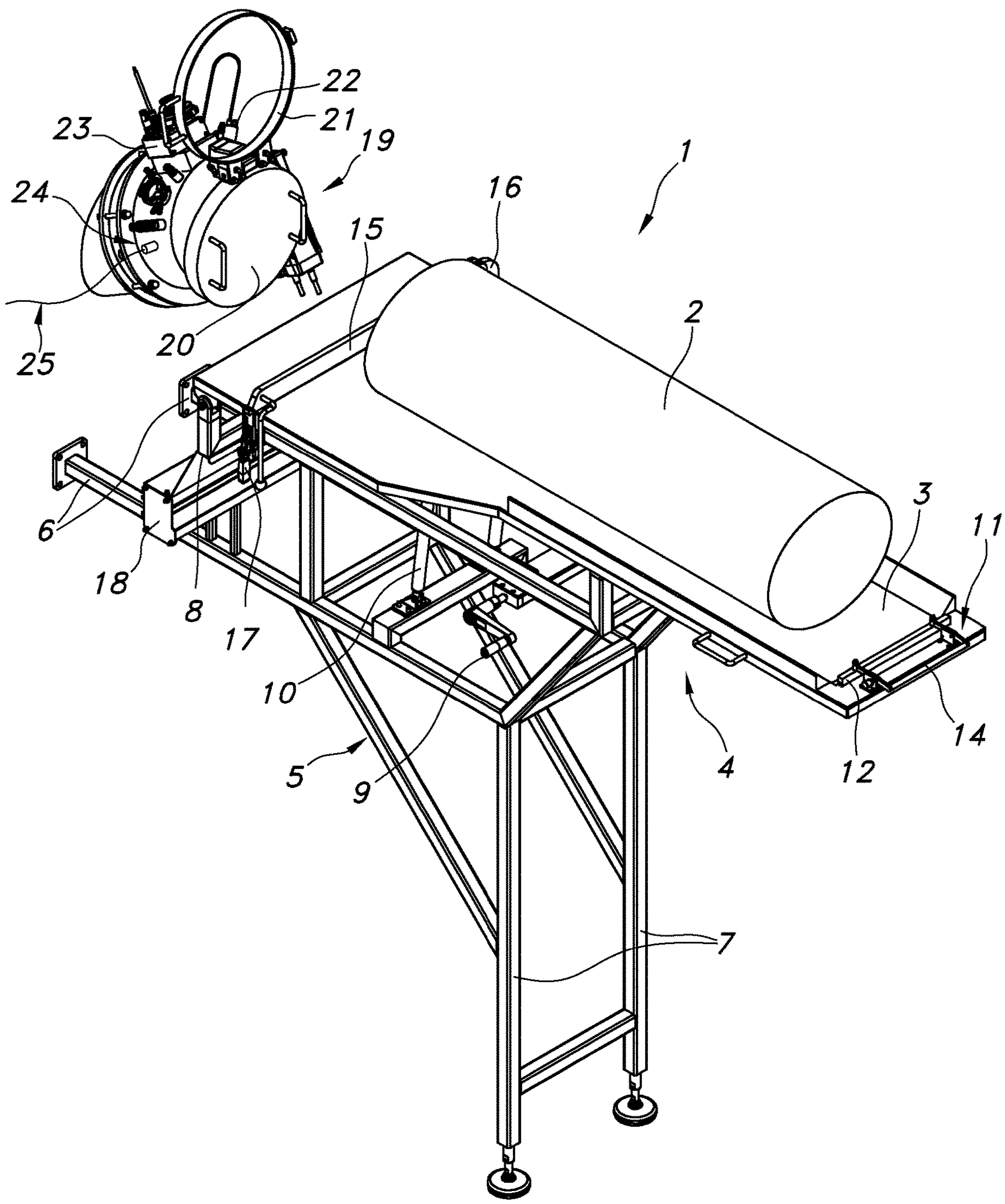
FIG. 1 is a perspective view of the system according to the invention for transferring sterile components into a pharmaceutical isolator, showing a bag laid out on a transfer table that has a tiltable table surface, a cutting device, and a clamp bar, and a decontamination connector with a clamping ring.
Figure 2:
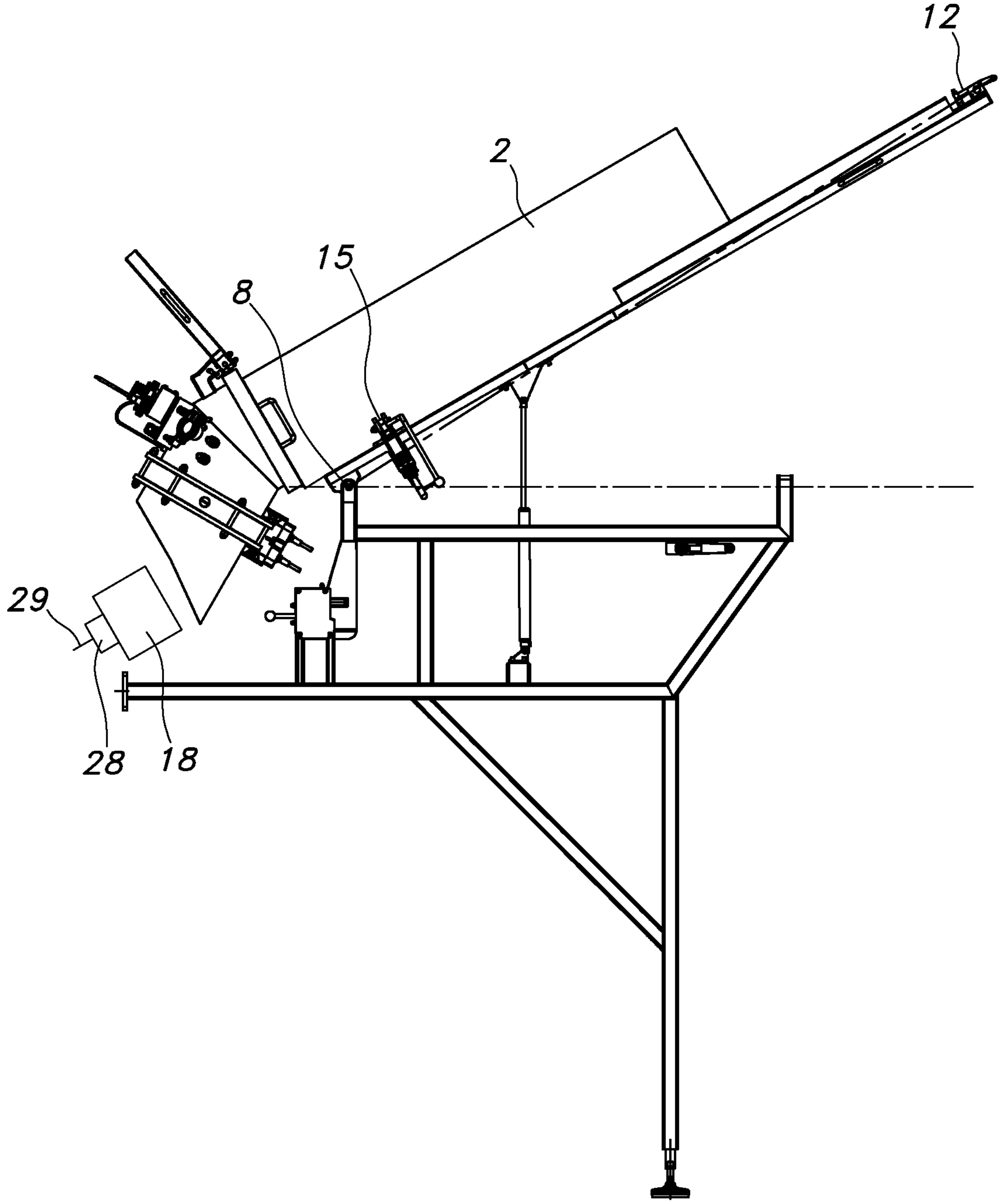
FIG. 2 illustrates the table surface of the transfer table in a tilted position.

The present invention will now be described more fully in detail with reference to the accompanying drawings FIGS. 1 and 2 illustrate a system 1 for aseptically transferring components from a bag 2 into a pharmaceutical isolator. The components themselves are sterile and are contained within the hermetically sealed bag 2 in a manner that maintains a sterile atmosphere. The isolator is a conventional isolator and is not shown herein. The system 1 is such that it may be used with conventional isolators by mounting a decontamination connector 19 in front of a filling port on the isolator. The decontamination connector 19, shown in FIG. 1, is mounted in a gas-tight manner on the isolator, directly in front of the filling port, whereby the closure on the filling port remains fully functional. The decontamination connector 19 also its own closure means, which in the embodiment shown is constructed as separate, removable sealing cap 20.

The bag 2 is shown schematically as a cylindrical bag that has been placed on a table surface 3 of a transfer table 4. The transfer table 4 is supported on a table frame 5 that is constructed from a plurality of struts that include, inter alia, connector struts 6 and table legs 7. Connector plates are provided at the free ends of the connector struts 6. These connector plates have bores to allow the connector plates to be screwed or bolted to the front of the isolator, so as to firmly attach the transfer table 4 to the isolator. Floor pads or plates are attached to the free ends of the table legs 7. In the embodiment shown, the floor plates are without bores, but it is understood that bores may be provided in these plates so that the table legs 7 may be fastened to the floor.

For purposes of clarity in the following description, the end of the transfer table 4 that is intended to be attached to the isolator is referred to hereinafter as the 'front' end and is shown in the drawing on the upper left, and the opposite end that is farthest from the isolator and that is shown in the drawing on the lower right is referred to as the 'back' end.

FIG. 2 shows the table surface 3 pivoted to a tilt position, so as to allow the components within the bag 2 to slide into the isolator. A pivot axis 8 is mounted on the table frame 5 near the front end of the transfer table 4 that allows the table surface 3 to be swung into a tilted position by raising the back end of the table surface 3. As is shown in FIG. 1, a hand crank 9 is mounted on the frame 5 to pivot the table surface 3 about the pivot axis 8 and to adjust the desired tilt of the table surface 3. In this embodiment, a telescopic cylinder 10 is also provided on the frame 5 to support the table surface 3 when it is in a tilted position. The cylinder 10 may be constructed as a hydraulic cylinder that is actuated by the hand crank 9, but it may also be embodied as a force accumulator, for example, in the form of a gas pressure spring or the like.

In reality, the rear end and the front end of the bag 2 deviate from the schematically illustrated cylindrical shape shown in FIG. 1 in that both end portions of the bag 2 contain no components and, thus, lie flat or relatively flat on the table surface 3. Prior to placing the bag 2 in position on the transfer table 4, the bag 2 is briefly placed in a vertical position, so that all of the components collect in a lower portion of the bag 2. The components at the very bottom of the bag 2 are then shifted forward a bit, to create a rear end of the bag 2 that is empty and able to lie flat on the table surface 3. A retainer 11 is mounted at the back end of the table surface 3 and has an elongate retainer bar 12 that clamps the rear end of the bag 2 to the table surface 3. This is done so that the bag 2 does slip forward when the table surface 3 is pivoted about the pivot axis 8 to create an incline toward the isolator, as shown in FIG. 2. A handle 14 serves to manipulate the retainer bar 12 similarly to an eccentric quick-release clamp into a release position above the table surface 3 or a retaining position in which the retainer bar 12 holds the bag 2 against the table surface 3.

The front end of the bag 2 extends beyond the front end of the table surface 3 and, because it is empty, also lies flat on the table. A clamp bar 15 located some distance from the front end of the transfer table 4 extends transversely across the table surface 3 and is pivotably mounted on the far side of the table surface 3, indicated at 16, and is partially hidden from view by the bag 2. The clamp bar 15 is opened/closed at the opposite end by means of a locking clamp 17, i.e., the clamp bar 15 is pivoted about the mount at 16 to raise it or lower and secure it onto the table surface 3. The purpose of the clamp bar 15 is to separate the section of the bag 2 that contains the components to be transferred into the isolator from a front section that is empty. To this end, the clamp bar 15 is pivoted upward before the bag 2 is placed on the table surface 3, the empty front section of the bag 2 is brought forward to extend out toward the front end of the table surface 3, beyond the location of the clamp bar 15 when closed, the clamp bar 15 lowered into place and secured, thereby creating a gas-tight separation between the component section of the bag that contains the sterile components, and the empty front section. Before the clamp bar 15 is locked in place, the operator checks to be sure that all the components in the bag are, in fact, collected behind where the clamp bar 15 will be applied against the bag and, if necessary, shifts any components that are too far forward back to a place that will be behind the bar 15. The clamp bar 15 is then lowered and pressed firmly against the table surface 3 and locked in place by means of the lock clamp 17. This effectively divides the bag 2 into two sections that are separated from one another in a gas-tight manner.

The component section of the bag is now fixed in place on the table surface 3 by the retainer 11 and the clamp bar 15, and the front end of the bag 2 extends beyond the clamp bar 15 far enough that it hangs down from the front end of the table surface 3 above a cutter bar 18. The cutter bar 18 has an elongate housing which runs transversely to the table surface 3. Within the housing is a longitudinally movable blade 29 and a handgrip 28 that extends out from the front the housing, that is to say, projects away from the transfer table 4 in a direction toward the decontamination connector 19 and the isolator and, thus, is hidden from view in FIG. 1. FIG. 2 illustrates the position of the cutter bar 18 relative to the bag 2 when the table surface 3 is tilted upward. The front end of the bag 2 is shown here as being cylindrical, but in reality it would lie flat against the table surface 3, with the free front end hanging down beyond the edge of the table surface 3, directly in front of the cutter bar 18, which is then used to cut open the front end of the bag 2. The cut-off piece is discarded, so that the cut edge now forms an open front end of the bag 2. The connector struts 6 extend toward the isolator beyond the front end of the table surface 3, so that even when the struts 6 are fastened to the isolator, there is a sufficiently large free space to operate the cutter bar 18 without difficulty.

FIG. 1 shows a clamping ring 21 that is hingedly mounted on the decontamination connector 19 in a manner that allows the ring 21 to pivot between a release position in which the clamping ring 21 is swung away from the decontamination connector 19. After the sealing cap 20 has been removed from the connector 19 and the front end of the bag 2 slipped onto the connector, the clamping ring 21 may be swung downward so as to encircle the decontamination connector 19 and the bag 2.

Figure 3:
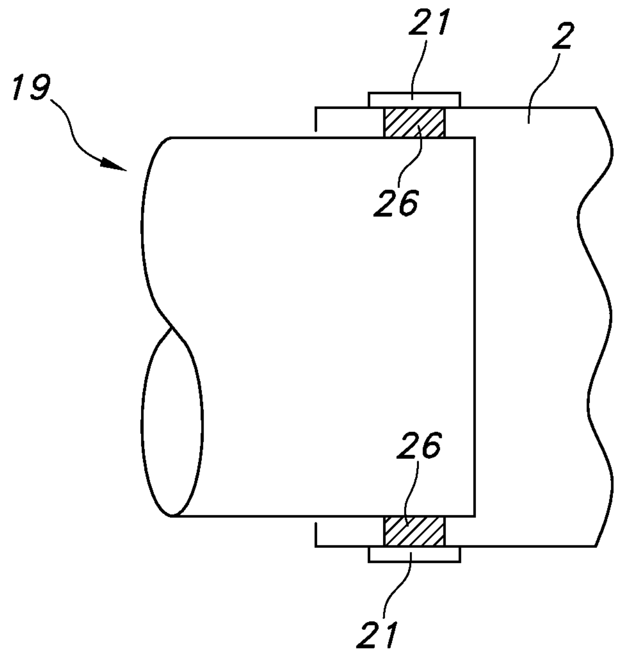
FIG. 3 illustrates a solid ring seal on the decontamination connector, the bag slipped over the decontamination connector and ring seal, and a clamping ring encircling the bag.
Figure 4:
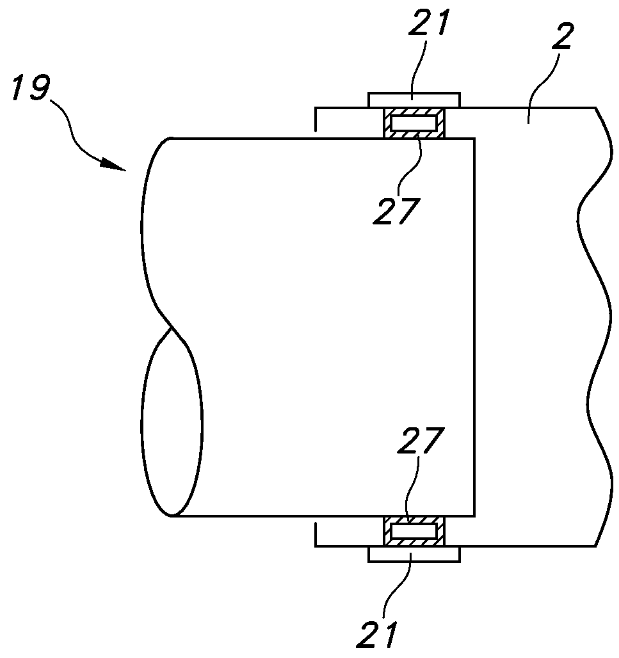
FIG. 4 illustrates a pneumatically activated ring seal on the decontamination connector, the bag slipped over the decontamination connector and ring seal, and a clamping ring encircling the bag.

FIGS. 3 and 4 show the front end of the bag 2, a ring seal 26/27, and the clamping ring 21 fitted around the outer circumference of the decontamination connector 19. In FIG. 3, the ring seal 26 is a solid seal and in FIG. 4, it is a pneumatically activated ring seal 27 that has a hollow profile. A pressure fluid, for example, pressurized air, is selectively applied to this seal 27, to force the outer diameter of the seal to expand, thereby creating a tight seal between the decontamination connector 19, the bag 2, and the clamping ring 21 and effectively preventing the ingress of contaminants. In the embodiments shown in FIGS. 3 and 4, the ring seal 26/27 is mounted on the outer surface of the decontamination connector 19. It is understood that the ring seal 26/27 may instead be mounted on the clamping ring 21, or on both the clamping ring 26 as well as the connector 19.

As mentioned above, the bag 2 has been divided into two sections—a cut-open front section that is empty and a component section that contains the components to be loaded into the isolator. The sealing cap 20 is removed prior to affixing the front section of the bag 2 to the decontamination connector 19. If the ring seal 26 is a pneumatic seal, it is first deactivated and then the sealing cap 20 removed. At this point, the decontamination connector 19 is open.

The clamping ring 21 is then pivoted part of the way down toward the decontamination connector 19, but initially only so far as to leave a gap between the clamping ring 21 and the decontamination connector 19. The front end of the bag 2 is then threaded through this gap and pushed over the ring seal 26 onto the decontamination connector 19. The clamping ring 21 is now guided into its clamping position around the decontamination connector 19 with the ring seal 26 and the ring seal now activated by applying the pressure fluid, which causes the ring seal to expand, thereby creating a gas-tight seal of the bag 2 against the decontamination connector 19.

Now that the bag 2 is connected to the decontamination connector 19 in a gas-tight manner, a pressure fluid is introduced into the decontamination connector 19, to pressurize the interior space of the decontamination connector 19 and the space in the front section of the bag 2. A pressure sensor 22 begins sensing the prevailing pressure in the interior of the decontamination connector 19. The filling port on the isolator remains closed during this step. The pressure sensor 22 senses the prevailing pressure for a predetermined period of time, to determine whether the pressure created by the pressure fluid is maintained or whether there is a drop in pressure. The system 1, and specifically, the pressure sensor 22, are linked to an electronic control, which may be a separate system controller of the system 1 or an already existing controller of the isolator that has been functionally adapted to accommodate the pressure sensor 22 of the system 1.

If the pressure-drop test shows no drop in pressure, that is an indication that the bag 2 and decontamination connector 19 are, in fact, connected to each other in gas-tight manner and that the interior space formed by the front portion of the bag 2 and the decontamination connector 19 is now ready to be decontaminated. For this purpose, one or more spray nozzles 24 project into the decontamination connector 19. One suitable embodiment of the spray nozzle 24 is double nozzle with two sprayers that are oriented in different directions and that dispense a gaseous decontamination agent. In this embodiment, the double nozzle is equipped with a rotary drive 23 so that the sprayers are rotatable. The decontamination agent may be introduced into the decontamination connector 19 by means of a tube 25. The decontamination process follows a predetermined program sequence, for example, a sequence that defines the metering of the decontamination agent and its action time.

Once the decontamination has been completed and sterile conditions are ensured in the front section of the bag 2 and in the decontamination connector 19, the closure on the filling port of the isolator is opened in a manner known per se. The transfer table 4 is tilted, i.e., the hand crank 9 is turned to pivot the table surface 3 about the pivot axis 8 and bring the table surface 3 into an angle of inclination that facilitates a gravity-assisted slide of the components contained in the bag 2 into the isolator.

After all the components have been transferred from the bag 2 into the isolator, the filling port is closed, the ring seal deactivated, the clamping ring 21 pivoted into its release position, the bag 2 removed from the decontamination connector 19, the sealing cap 20 mounted on the decontamination connector 19, the retainer 11 released from the back end of the table surface 3, and the bag 2 removed from the transfer table 4. The system 1 according to the invention is now ready to receive a new bag 2 filled with sterile components.

What is claimed is:

1. A system for aseptically transferring components into a pharmaceutical isolator, the system comprising:

- a transfer table having a table surface for supporting a bag containing the components;
- a clamping bar movably mounted on the transfer table; and
- a decontamination connector that is mountable in front of a filling port of the isolator;
- wherein the transfer table is placed in front of the filling port of the isolator, such that a front end of the table surface is close to the filling port and a back end thereof is remote from the filling port;
- wherein the clamping bar is configured to pivot between an open position and a clamped position, and wherein when the clamping bar is in the clamped position it is pressed firmly down onto the bag against the table surface, the clamping bar in the clamped position separating the bad into a front section and a component section, the front section of the bag located closer to the filling port and empty of components, and the component section of the bag containing the components; and
- wherein the decontamination connector includes a spray nozzle that contains a decontamination agent and that opens into an interior space of the decontamination connector.

2. The system of claim 1 further comprising:

- a tilt mechanism that is mounted on a frame that supports the transfer table and that allows the table surface to be selectively tilted between a horizontal position and a tilt position that creates an inclined surface down toward the front end of the table.

3. The system of claim 2 further comprising:
a retainer bar that is movably mounted on the back end of the table so as to selectively hold a portion of the component section of the bag against the table.

4. The system of claim 1 further comprising:
a ring seal on an outer circumference of the decontamination connector; and
a clamping ring that is mounted on the decontamination connector and that is movable between a release position and a clamping position;
wherein, after the front section of the bag has been pushed over the ring seal and the decontamination connector, the clamping ring is movable into the clamping position, thereby holding the bag against the decontamination connector in a gas-tight manner.

5. The system of claim 4, wherein the ring seal has a hollow profile and is activatable by applying a pressure fluid to the ring seal, thereby forcing the ring seal to expand in diameter.

6. The system of claim 1, further comprising:
a cutter bar that is mounted on the front end of the transfer table and that is movable so as to cut across the bag to open the front end of the bag.

7. The system of claim 6, wherein the cutter bar has a blade that is movable transversely to a longitudinal axis of the table surface.

8. The system of claim 1, further comprising:
a pressure sensor for sensing a prevailing pressure inside the decontamination connector;
wherein the pressure sensor is linked to an electronic control and, while sensing the prevailing pressure, signals a drop in pressure if such does occur.

9. The system of claim 1, wherein positioning the clamping bar in the clamped position creates a gas-tight separation between the front section and the component section.

* * * * *